(12) United States Patent
Buchholz et al.

(10) Patent No.: US 10,850,611 B2
(45) Date of Patent: Dec. 1, 2020

(54) FUEL TANK AND VEHICLE

(71) Applicants: AUDI AG, Ingolstadt (DE); VOLKSWAGEN AG, Wolfsburg (DE)

(72) Inventors: Andre Buchholz, Georgsmarienhütte (DE); Christian Schönwald, Wolfsburg (DE); Ismail Levent Sarioglu, Boston, MA (US); Maik Kraus, Magdeburg (DE)

(73) Assignees: VOLKSWAGEN AG, Wolfsburg (DE); AUDI AG, Ingolstadt (DE)

( * ) Notice: Subject to any disclaimer, the term of this patent is extended or adjusted under 35 U.S.C. 154(b) by 0 days.

(21) Appl. No.: 16/639,092

(22) PCT Filed: Aug. 17, 2018

(86) PCT No.: PCT/EP2018/072324
§ 371 (c)(1),
(2) Date: Feb. 13, 2020

(87) PCT Pub. No.: WO2019/038198
PCT Pub. Date: Feb. 28, 2019

(65) Prior Publication Data
US 2020/0231034 A1 Jul. 23, 2020

(30) Foreign Application Priority Data

Aug. 22, 2017 (DE) .................. 10 2017 214 606

(51) Int. Cl.
*B60K 15/063* (2006.01)
*F17C 11/00* (2006.01)
*F17C 13/08* (2006.01)
*B60K 15/03* (2006.01)

(52) U.S. Cl.
CPC .......... *B60K 15/063* (2013.01); *F17C 11/005* (2013.01); *F17C 13/084* (2013.01); *B60K 2015/03046* (2013.01); *B60K 2015/03144* (2013.01); *B60K 2015/0632* (2013.01); *B60K 2015/0633* (2013.01); *B60K 2015/0634* (2013.01); *F17C 2201/0119* (2013.01); *F17C 2205/0119* (2013.01);
(Continued)

(58) Field of Classification Search
CPC . B60K 11/005; B60K 2015/0631–0634; F16C 11/005; F16C 13/084
See application file for complete search history.

(56) References Cited

U.S. PATENT DOCUMENTS

| | | | |
|---|---|---|---|
| 6,974,156 B2* | 12/2005 | Kosuge | B60K 15/03006 280/831 |
| 9,878,611 B1* | 1/2018 | Abd Elhamid | F02B 43/10 |
| 10,076,956 B2* | 9/2018 | Ohashi | B60K 28/14 |

(Continued)

FOREIGN PATENT DOCUMENTS

| | | |
|---|---|---|
| DE | 103 12 205 A1 | 10/2003 |
| DE | 10 2005 003 669 A1 | 8/2005 |

(Continued)

*Primary Examiner* — Kevin Hurley
(74) *Attorney, Agent, or Firm* — Seed IP Law Group LLP (57) ABSTRACT

The invention relates to a fuel tank (10) having at least two layers (12) stacked one on top of the other, wherein the layers (12) each have a plurality of single tanks (14) lined together. The invention further relates to a vehicle (100) having the fuel tank (10).

8 Claims, 4 Drawing Sheets

(52) U.S. Cl.
CPC ................ *F17C 2205/0142* (2013.01); *F17C 2221/012* (2013.01); *F17C 2260/018* (2013.01); *F17C 2270/0184* (2013.01)

(56) References Cited

U.S. PATENT DOCUMENTS

| | | | |
|---|---|---|---|
| 10,081,242 B2* | 9/2018 | Okawachi | B60K 15/03006 |
| 10,538,159 B2* | 1/2020 | Kataoka | B60K 15/03006 |
| 10,589,788 B1* | 3/2020 | Milton | B62D 21/02 |
| 2013/0224410 A1 | 8/2013 | Nozawa | |

FOREIGN PATENT DOCUMENTS

| | | |
|---|---|---|
| DE | 20 2006 004 434 U1 | 6/2006 |
| DE | 10 2006 019 014 A1 | 10/2007 |
| DE | 10 2011 051 436 A1 | 1/2013 |
| EP | 1 431 096 A2 | 6/2004 |
| EP | 2 508 381 A2 | 10/2012 |
| EP | 3 346 179 A1 | 7/2018 |
| FR | 2 857 630 A1 | 1/2005 |
| GB | 2 374 056 A | 10/2002 |
| JP | 2004-017669 A | 1/2004 |
| WO | 03/085314 A2 | 10/2003 |
| WO | 2005/079540 A2 | 9/2005 |
| WO | 2015/017844 A1 | 2/2015 |

\* cited by examiner

FUEL TANK AND VEHICLE

BACKGROUND

Technical Field

Embodiments of the invention relate to a fuel tank and a vehicle comprising the fuel tank.

Description of the Related Art

Fuel cells use the chemical conversion of a fuel with oxygen into water in order to generate electrical energy. For this purpose, fuel cells contain the so-called membrane electrode assembly (MEA) as a core component, which is an arrangement of an ion-conducting (often proton-conducting) membrane and of a catalytic electrode (anode and cathode), respectively arranged on both sides of the membrane. The latter generally comprise supported precious metals, in particular platinum. In addition, gas diffusion layers (GDL) can be arranged on both sides of the membrane electrode assembly, on the sides of the electrodes facing away from the membrane. Usually, the fuel cell is formed by a plurality of MEAs arranged in a stack (fuel cell stack) whose electrical power outputs accumulate. Between the individual membrane electrode assemblies, bipolar plates (also called flow field plates or separator plates) are usually arranged, which ensure a supply of the individual cells with the operating media, i.e., the reactants, and are usually also used for cooling. In addition, the bipolar plates also ensure an electrically conductive contact to the membrane electrode assemblies.

While the fuel cell is operating, the fuel (anode operating medium), in particular hydrogen $H_2$ or a hydrogen-containing gas mixture, is supplied to the anode via an anode-side open flow field of the bipolar plate, where electrochemical oxidation of $H_2$ into protons $H^+$ occurs with the release of electrons ($H_2 \rightarrow 2 H^+ + 2 e^-$). Protons are transported (water-bound or water-free) from the anode chamber into the cathode chamber across the electrolyte or membrane that separates and electrically insulates the reaction chambers gas tight from each other. The electrons provided at the anode are guided to the cathode via an electrical line. The cathode receives, as a cathode operating medium, oxygen or a gas mixture containing oxygen (such as air) via an open flow field of the bipolar plate on the cathode side, so that a reduction of $O_2$ to $O^{2-}$ with gain of electrons takes place (½ $O_2 + 2 e^- \rightarrow O^{2-}$). At the same time, in the cathode chamber the oxygen anions react with the protons transported across the membrane with the formation of water ($O^{2-} + 2H^+ \rightarrow H_2O$).

CFRP pressure accumulators with a maximum pressure of 700 bar in the rear of the vehicle and in the transmission tunnel without structural integration have hitherto been used as storage tanks for the fuel. CFCP stands for carbon fiber reinforced plastic or carbon fiber reinforced plastic. Non-structural incorporation of metal hydride tanks is also known. A structural integration at the installation site is also known; this does not contribute significantly to the overall rigidity. This results in disadvantages with regard to a lower interior volume and also installation space restrictions. Furthermore, potential structural savings are not exploited.

In order to compensate for this, a plurality of smaller tanks have previously been used in place of a single tank to constitute the desired capacity and range, which in itself leads to a significant increase in costs. Furthermore, carbon fiber tanks have been used to compensate for the weight penalty of smaller tanks with a lower ratio of useful volume to the required installation space.

DE 10 2005 003 669 A1 discloses a motor vehicle having a frame assembly, wherein a fluid storage volume for fuel is defined in an elongated rail section of the frame assembly.

DE 10 2011 051 436 A1 discloses a hydrogen accumulator (pressure accumulator) for a vehicle serving as a reinforcement of a frame of a supporting structure. In the event that the vehicle impacts an obstacle, connecting elements fail before an excessively high force is introduced into the pressure accumulator, which could lead to pressure accumulator damage.

BRIEF SUMMARY

Embodiments of the invention provide a fuel tank which has increased rigidity relative to known fuel tanks.

In some embodiments, a fuel tank having at least two layers stacked one on top of the other is provided, wherein the layers each have a plurality of linked single tanks.

Given that the fuel tank has two layers stacked one on top of the other, that is, two layers, whose main surfaces (the largest surfaces) oppose one another, the stiffness, in particular the bending resistance, of the tank, is greatly increased. The layers are arranged in particular in planes parallel to one another. There is the possibility of structural integration into a passenger compartment of a vehicle, that is, the stiffening of the passenger compartment. The fact that the layers are stacked on top of each other does not necessarily mean that the layers are spatially stacked over each other, but this may nevertheless be the case. Rather, this can mean that main surfaces of the at least two layers are linked flat against one another. In particular, the single tanks are linked parallel to one another, as a result of which the layer is optimally filled with single tanks. The layers extend in particular within one plane; that is, they have a planar extension.

The single tanks are preferably (formed) in an elongated manner. The fact that the single tanks are elongated means that their length is more than their width, thickness or diameter. The length of the single tanks is preferably at least five times, in particular at least ten times, particularly preferably at least twenty times as long as their width, thickness or their diameter. The single tanks can have a rectangular, in particular square, or round cross-section. The single tanks can also be referred to as single tanks, that is, in particular they represent volumes which are separate from each other. The elongated single tanks are preferably linked in such a way that longitudinal sides of the single tanks are linked to one another, whereby a compact fuel tank is created.

The single tanks are in particular metal hydride energy accumulators. Such single tanks are particularly suitable for storing hydrogen.

The individual layers and/or the single tanks are preferably connected to one another so as to conduct force, in particular glued or screwed, in order to further increase the stiffness of the fuel tank as a whole.

It is preferably provided that a longitudinal extension of the elongated single tanks defines an orientation of the respective layer, and the at least two layers have a different orientation. The single tanks of one of the layers are thus arranged transversely (rotated) relative to the single tanks of the at least one other layer. As a result, the fuel tank becomes even stiffer, in particular more bend-resistant in a second direction, as a result of which the stiffening (rigidification) of the passenger compartment can be further increased.

It is preferably provided that the orientations of the layers have an angle of 90° to one another. The single tanks are therefore arranged in a plurality of layers rotated by 90° relative to one another. An optimum stiffness of the fuel tank is thus achieved, since the fuel tank is stiffened in two directions arranged at right angles to one another. A particularly good structural integration, that is, stiffening, of a passenger compartment of a vehicle can thereby be achieved.

According to a particularly advantageous embodiment of the invention, at least one of the single tanks has a connection that is arranged at an end side and is arranged within a structure of the fuel tank. The structure is designed, in particular, to transmit to the single tanks forces acting on the fuel tank from outside of the fuel tank. In this case, the structure is particularly designed in such a (stiff) manner that the connection is protected from the forces. The connection serves in particular for filling and/or emptying the single tank.

The connection is preferably designed as a screw connection, which represents a particularly simple variant of the connection. In particular, the connection comprises a valve or is designed as a valve. This is particularly advantageous since, compared to fuel cell operation, operating pressures are relatively high when fueling the fuel tank.

For connecting the single tanks to a fuel system of a fuel cell system, in particular an internal connection to the single tank (that is, within a structure of the single tank, but typically not within a filling volume of the single tank) is used. The connection is thus protected by the single tank, and the single tank, in particular the fuel tank, has a planar connecting surface on the structure side. As a result, the tank can be used for load conduction in the event of a crash, that is, during an impact.

It is thus preferably provided that the structure of the fuel tank is a structure of the single tank (in particular a tank cap of the single tank). The tank cap is designed in particular as an extension of the single tank and is thus designed in one piece (integrally) with the single tank. This ensures a particularly good force transmission into the single tank, and a particularly good protection of the connection. A structural connection, for example, to a supporting structure of a vehicle, is thus realized by means of the tank cap (connection cap, in particular valve cap). The tank cap can, in particular, be designed to be open at the end face of the single tank, so that accessibility to the connection is ensured. The single tank can thus comprise not only a partial region of the single tank surrounding the filling volume of the single tank, but also at least one further structure integrally formed with it. In particular, the connections are protected as described by the further structures of the single tanks.

It is preferably provided that the structure of the fuel tank is an auxiliary structure separate from the single tanks. Thus, the connection represents an external connection (outside of the single tank) which is protected by additional structural measures, that is, the auxiliary structure, in particular by an auxiliary frame. This reduces the construction effort and thus the costs of the single tank. The auxiliary structure is preferably designed as a rail within which several, in particular all, connections of the single tanks (one layer) are arranged.

In the aforementioned integration of the connection (the connection of the tank) into the tank cap, an additional auxiliary structure (an auxiliary frame) is in particular not provided.

It is preferably provided that the at least one single tank has at least one supply line which is guided through the structure transversely to a longitudinal extension of the single tanks. The at least one supply line comprises in particular two supply lines (in particular a supply line and a discharge line), which can connect the connections (in particular valves) of the single tanks (a layer) to one another. The supply lines (for the fuel) are guided through lateral openings in the tank cap and in particular from a tank cap to the next tank cap when a structure is designed as a tank cap (that is, with an integral structure of the single tank). If the structure is designed as an auxiliary structure, in particular as a rail, the supply lines can be guided within the rail and protected therefrom.

Preferably, all single tanks have the mentioned end-side connection, wherein the connections, in particular all connections, are arranged within one or more of the aforementioned structures, and are protected by the structure(s).

A fuel cell vehicle may have a fuel cell for providing electrical energy for an (electric) drive motor of the vehicle. The fuel tank is thus configured to store a fuel, in particular hydrogen, for the fuel cell. The hydrogen thus serves as fuel for the fuel cell vehicle. Such embodiments create a particularly stiff fuel cell vehicle which is distinguished by its reduced mass and at the same time increased resistance to deformation, in particular in the event of an accident.

The fuel tank is preferably structurally integrated into a supporting structure of the vehicle, that is, for example, its chassis, its passenger compartment or its frame. This stiffens the bearing structure of the vehicle. In other words, the fuel tank forms part of the bearing structure of the vehicle.

The fuel tank preferably serves as a load path in the event of an impact (crash), both in the event of a side impact and a frontal impact.

The fuel tank is preferably arranged in the vehicle in such a way that the stacked layers are arranged one above the other, which ensures a compact installation position of the fuel tank.

It is preferably provided that the vehicle comprises a passenger compartment below which the fuel tank is arranged. Thus, the fuel tank is integrated in particular into the bearing structure of an underbody of the vehicle. This yields weight savings in the region of the middle section (that is, in the region of the passenger compartment) and, in addition, a larger usable vehicle interior.

It is preferably provided that the orientation of one of the layers corresponds to the vehicle longitudinal direction, and the orientation of another layer of the fuel tank corresponds to the vehicle transverse direction. Thus, the vehicle is stiffened both in the vehicle longitudinal direction and in the vehicle transverse direction. In addition, the passenger compartment is better protected against deformations, both in the event of a side impact and a frontal impact.

It is preferably provided that the single tanks of one layer extend with their orientation in the longitudinal direction of the vehicle over the entire length of the passenger compartment. Furthermore, it is preferably provided that the single tanks of one layer extend with their orientation in the transverse direction of the vehicle over the entire width (in particular between side skirts of the vehicle) of the passenger compartment. The passenger compartment is thus optimally stiffened (rigidified) and protected during an impact.

BRIEF DESCRIPTION OF THE SEVERAL VIEWS OF THE DRAWINGS

The various embodiments of the invention mentioned in this application may be combined advantageously with one another unless stated otherwise in individual cases.

The invention is explained below in exemplary embodiments in reference to the respective drawings. The following is shown.

DETAILED DESCRIPTION

Figure 1:
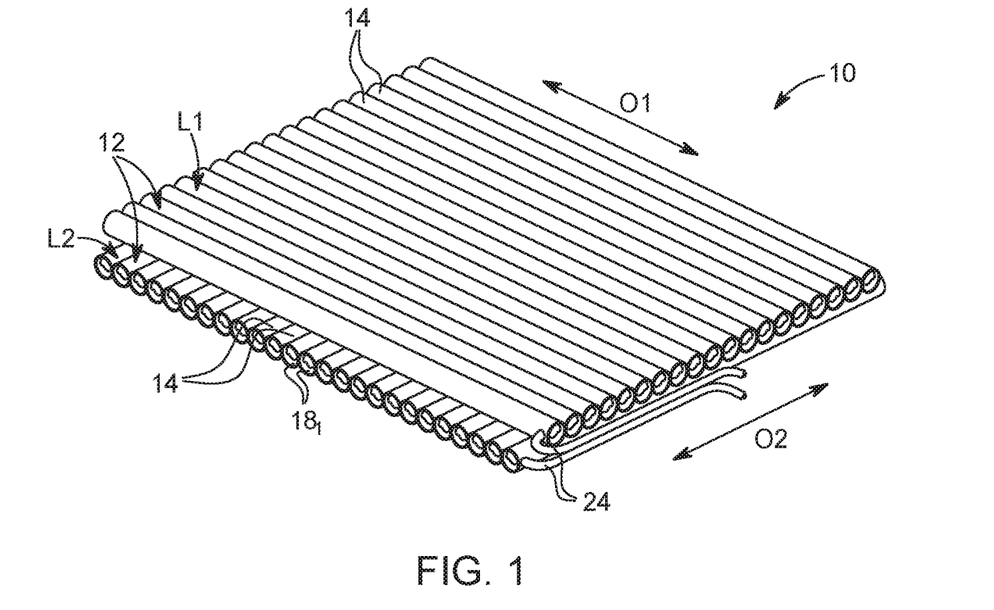
FIG. 1 shows a fuel tank according to a particularly advantageous embodiment.

FIG. 1 shows a fuel cell tank 10 according to a particularly advantageous embodiment of the invention. The fuel tank 10 has at least two layers 12 stacked one on top of the other, wherein each of the layers 12 has a plurality of single tanks 14 linked parallel to one another. The single tanks 14 are designed in elongated form and are linked to each another in such a way that longitudinal sides of the single tanks 14 are linked to each other. The single tanks 14 can be embodied as metal hydride accumulators, for example, for storing hydrogen. In this case, the metal hydride is arranged in the single tanks 14 designed as hollow rods.

A longitudinal extension of the elongated single tanks 14 defines an orientation O1 or O2 of the respective layer L1 or L2. In this case, the two layers L1 and L2 have a different orientation. The orientations O1 and O2 thus enclose an angle which in the depicted case is 90° (degrees). It can easily be seen that the individual layers have a differing stiffness depending on the direction of stress. Given that the two layers 12 are arranged in a manner rotated 90° in relation to one another, the fuel tank 10 has approximately the same rigidity in two orthogonal directions.

The single tanks 14 have connections 16 arranged on the end side, which can subsequently be designed as valves 16 which are arranged inside structures 18 of the fuel tank 10. The structures 18 protect the valves 16 in the event of an increased application of force on the fuel tank 10, e.g., in the event of an impact. Furthermore, the structures 18 enable the fuel tank 10 to be connected to an adjoining (vehicle) structure and thus serve to transmit force between the (vehicle) structure and the single tanks 14.

Figure 2:
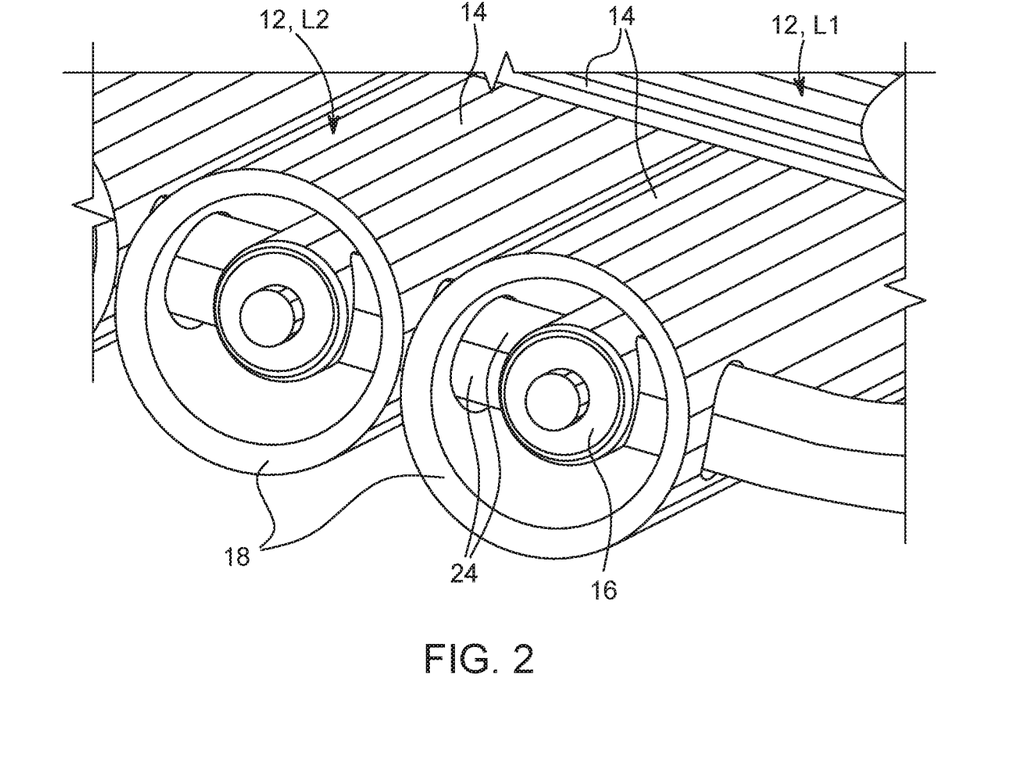
FIG. 2 shows a detailed view of the fuel tank.

As can be seen in FIG. 1 and in particular in FIG. 2, the structures 18 are structures 20 of the single tanks 14. For this purpose, the structures 20 are designed as projections of the single tanks 14 arranged on the end side and integrally connected thereto. They can thus also be referred to as a tank cap 20, connection cap 20 or valve cap 20. The structures 20 may be designed to be open at the end side to allow access to the valves 16.

Furthermore, the structures 20 have lateral openings 22 which represent passages for supply lines 24 of the fuel tank 10. The supply lines 24 can thereby be guided through the structures 20 and connect all the valves 16 of the single tanks 14 of the respective layer 12 (L1 or L2) to one another. Two supply lines 24 can be provided per layer 12, one as a supply line and one as a discharge line.

Figure 3:
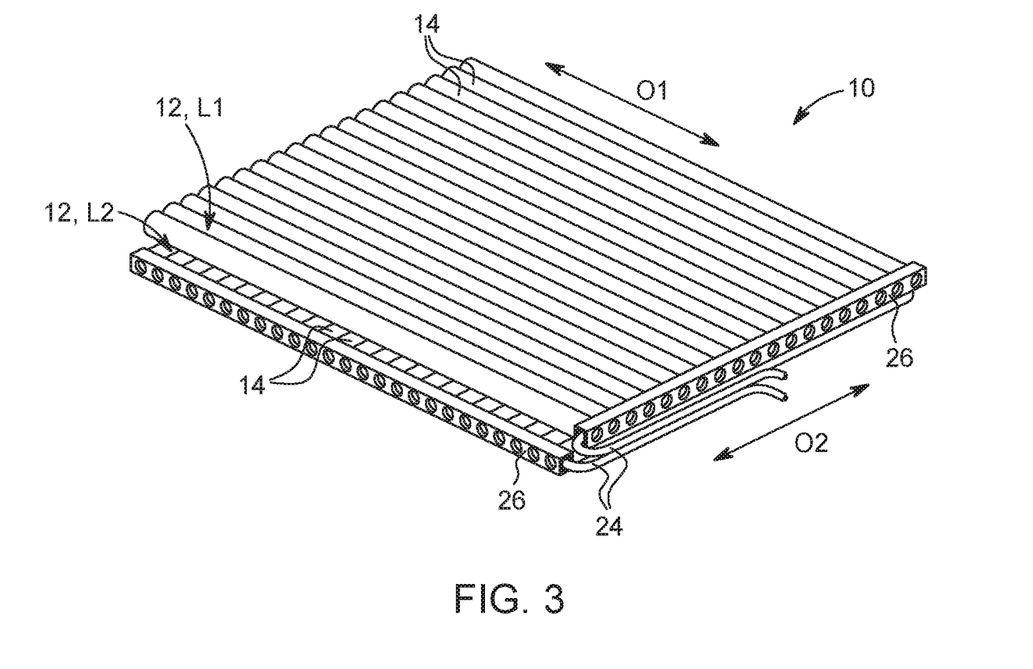
FIG. 3 shows a fuel tank according to a further particularly advantageous embodiment.

However, the structures 18 need not be part of the single tanks 14. Alternatively, the structures 18 of the fuel tank 10 may also be designed as auxiliary structures 26 separate from the single tanks 14. Of course, the fact that the auxiliary structures 26 are separate from the single tanks 14 does not preclude them from being connected to the single tanks 14 in a force-conducting manner.

Rather, this means that components which are formed independently of the single tanks 14 are provided as auxiliary structures 26.

The individual layers 12 (L1 and L2) can be connected to one another in a force-conducting manner, for example, glued or screwed, in order to further increase the stiffness of the fuel tank 10.

Figure 4:
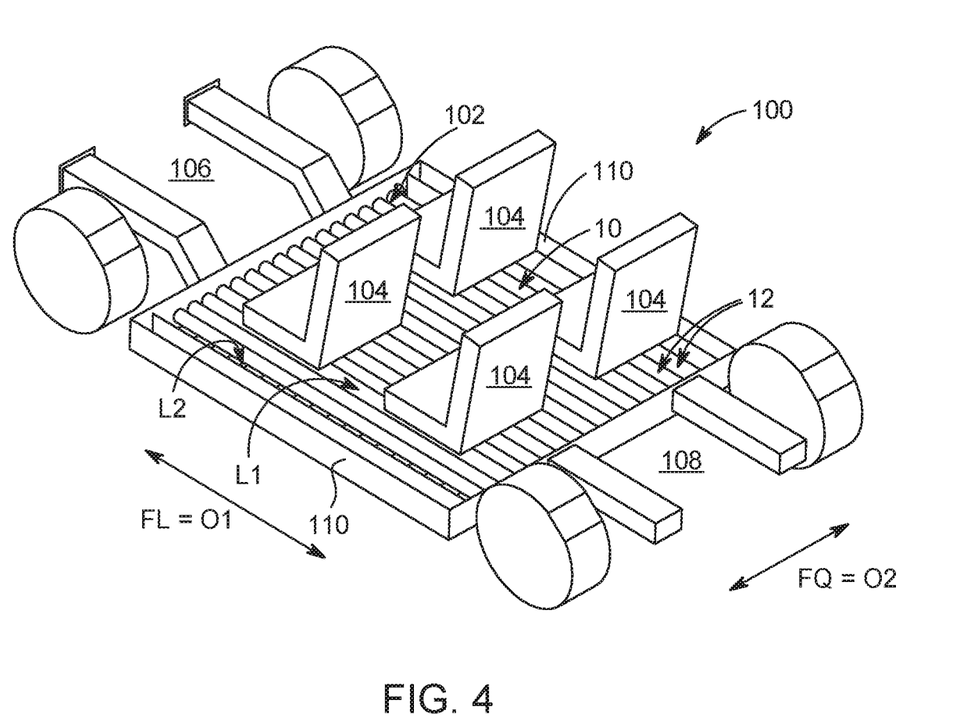
FIG. 4 shows a schematic representation of a vehicle according to a particularly advantageous embodiment.

FIG. 4 shows a vehicle 100 which may be configured as a fuel cell vehicle. In this case, the vehicle 100 includes a fuel cell (not shown) for providing electrical energy to a drive motor (a traction motor, not shown) of the vehicle 100. The fuel tank 10 is used to store hydrogen which is converted into electrical energy by the fuel cell during its operation.

The vehicle 100 has a passenger compartment 102 that encircles the seats 104 of the vehicle 100 and thus forms a protected space for vehicle occupants in a known manner. The fuel tank 10 is arranged below the seats 104 and the passenger compartment 102. The fuel tank 10 may occupy substantially the entire area underneath the passenger compartment 102. The elongated single tanks 14 of the first layer L1 thus extend substantially over the entire length of the passenger compartment 102, while the single tanks 14 of the second layer L2 extend substantially over the entire width of the passenger compartment 102. Thus, a power line is provided between a front section 106 and a rear section 108 of the vehicle 100 by means of the fuel tank 10. This is done mainly by means of the first layer L1. Furthermore, the two side skirts 110 are also connected in a force-conducting manner by means of the fuel tank 10, wherein this is ensured mainly by the second layer L2.

For this purpose, the orientation O1 of the first layer L1 corresponds to the vehicle longitudinal direction FL, and the orientation O2 of a second layer L of the fuel tank 100 corresponds to the vehicle transverse direction FQ. Of course, the arrangement of the layers L1 and L2 could be swapped so that the second layer L2 is provided above the first layer L1.

Furthermore, in the embodiments according to FIGS. 1 to 4, at least one further layer 12 could also be provided. The orientation of the at least one further layer could correspond to or be different from the orientation O1 or O2.

As a whole, an increased stiffness of the fuel tank 10 may be achieved by the fuel tank 10. This increased stiffness can be used to make the vehicle rigid and/or lighter. This is accomplished with simultaneously increased safety for passengers of the vehicle 100 in the event of an accident.

In addition, the solutions of the exemplary embodiments can be combined with each other.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A fuel tank having at least two layers stacked on top of each other, wherein the layers each have a plurality of single tanks linked to one another, wherein the single tanks are designed in elongated form, and a longitudinal extension of the elongated single tanks defines an orientation of the respective layer, wherein the at least two layers have a different orientation, and wherein the orientations of the layers have an angle of 90° in relation to each other.

2. The fuel tank according to claim 1, wherein at least one of the single tanks has a connection arranged at an end side which is arranged inside a structure of the fuel tank.

3. The fuel tank according to claim 2, wherein the structure of the fuel tank is a structure of the single tank.

4. The fuel tank according to claim 2, wherein the structure of the fuel tank is an auxiliary structure separate from the single tanks.

5. The fuel tank according to claim 4, wherein the at least one of the single tanks has at least one supply line which is guided through the structure transversely to a longitudinal extension of the single tanks.

6. A fuel cell vehicle, comprising:
   a fuel tank having at least two layers stacked on top of each other, wherein the layers each have a plurality of single tanks linked to one another, wherein the single tanks are designed in elongated form, and a longitudinal extension of the elongated single tanks defines an orientation of the respective layer, wherein the at least two layers have a different orientation, and wherein the orientations of the layers have an angle of 90° in relation to each other.

7. The vehicle according to claim 6, wherein the vehicle further comprises a passenger compartment above the fuel tank.

8. The vehicle according to claim 6, wherein an orientation of a first one of the layers corresponds to a vehicle longitudinal direction, and an orientation of a second one of the layers corresponds to a vehicle transverse direction.

* * * * *

UNITED STATES PATENT AND TRADEMARK OFFICE
CERTIFICATE OF CORRECTION

PATENT NO.         : 10,850,611 B2                                             Page 1 of 1
APPLICATION NO.    : 16/639092
DATED              : December 1, 2020
INVENTOR(S)        : Andre Buchholz et al.

It is certified that error appears in the above-identified patent and that said Letters Patent is hereby corrected as shown below:

In the Claims

Column 7, Line 6:
"claim 4," should read, --claim 2,--.

Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*